(12) United States Patent
Dickinson et al.

(10) Patent No.: US 8,486,338 B2
(45) Date of Patent: Jul. 16, 2013

(54) GAS-LIQUID CONTACTOR

(71) Applicant: Specialist Process Technologies Limited, Tortola (VG)

(72) Inventors: Theodore E. Dickinson, Huffman, TX (US); David J. Parkinson, Clevedon (GB); Kevin E. Collier, Kaysville, UT (US)

(73) Assignee: Specialist Process Technologies Limited, Tortola (VG)

( * ) Notice: Subject to any disclaimer, the term of this patent is extended or adjusted under 35 U.S.C. 154(b) by 0 days.

(21) Appl. No.: 13/692,111

(22) Filed: Dec. 3, 2012

(65) Prior Publication Data

US 2013/0089480 A1    Apr. 11, 2013

Related U.S. Application Data

(63) Continuation of application No. 12/095,400, filed as application No. PCT/GB2006/004481 on Nov. 29, 2006, now abandoned.

(30) Foreign Application Priority Data

Nov. 30, 2005    (GB) .................................. 0524479.3

(51) Int. Cl.
   *B06B 1/00* (2006.01)
(52) U.S. Cl.
   USPC .......................... 422/128; 162/57; 239/102.2
(58) Field of Classification Search
   USPC ............... 422/128; 162/29, 38, 57; 239/102.2
   See application file for complete search history.

(56) References Cited

U.S. PATENT DOCUMENTS

| | | | |
|---|---|---|---|
| 3,391,787 A | 7/1968 | Salomon |
| 4,168,295 A | 9/1979 | Sawyer |
| 4,279,743 A | 7/1981 | Miller |
| 4,997,549 A | 3/1991 | Atwood |
| 5,017,351 A | 5/1991 | Rafson |
| 5,059,309 A | 10/1991 | Jordan |
| 5,192,423 A | 3/1993 | Duczmal et al. |
| 5,224,604 A | 7/1993 | Duczmal et al. |
| 5,458,738 A | 10/1995 | Chamblee et al. |
| 5,472,567 A | 12/1995 | Torregrossa |
| 6,193,878 B1 | 2/2001 | Morse et al. |
| 6,391,099 B1 | 5/2002 | Ina et al. |
| 6,582,498 B1 | 6/2003 | Sass et al. |
| 6,830,608 B1 | 12/2004 | Peters |
| 7,429,621 B2 | 9/2008 | Miller et al. |
| 7,504,075 B2 | 3/2009 | Marhasin |

FOREIGN PATENT DOCUMENTS

| | | |
|---|---|---|
| DE | 4323212 | 1/1995 |
| EP | 1541227 A2 | 6/2005 |
| FR | 2833618 | 6/2003 |
| GB | 934416 A | 8/1963 |
| WO | WO-0145830 A1 | 6/2001 |

OTHER PUBLICATIONS

U.K. search report for application GB0524479.3 dated Mar. 22, 2007.
George A. Alers, EMAT Consulting "Electromagnetic Induction of Ultrasonic waves: EMAT, EMUS, EMAR", Sep. 2, 2004.
Office Action dated May 20, 2011 for U.S. Appl. No. 12/095,400.

*Primary Examiner* — Jill Warden
*Assistant Examiner* — Huy-Tram Nguyen
(74) *Attorney, Agent, or Firm* — Honigman Miller Schwartz and Cohn LLP

(57) ABSTRACT

A contactor for reacting a flow of gas with a liquid, comprises a vessel, a first chamber in the vessel and a second chamber in the vessel, the first and second chambers being linked only by a porous wall, and means for directing ultrasonic noise into at least one of the first and second chambers.

12 Claims, 3 Drawing Sheets

VIEW AA

VIEW AA

VIEW AA

GAS-LIQUID CONTACTOR

RELATED APPLICATIONS

This application is a continuation of application Ser. No. 12/095,400 filed Jul. 22, 2009.

BACKGROUND TO THE INVENTION

The present invention relates to an apparatus and method for reacting a gas stream with a liquid, and more particularly to an improved gas-liquid contactor and method of operating the same.

Natural gas can contain a number of non-hydrocarbon impurities both in the formation prior to extraction and/or following extraction at a wellhead. Some of these impurities are detrimental to efficient pipeline operation, whereas others have no effect on pipeline efficiency, but do affect the heat content or Btu rating of the natural gas.

Nearly all natural gas contains some water vapor when extracted. The water vapor content in natural gas can be much lower than saturation, but is usually higher than that desired for satisfactory pipeline operation. The formation of free water in pipelines caused by pressure and/or temperature reduction can result in the formation of hydrates. In addition to the problem of hydrates, the formation of free water or condensation can add to the power requirements involved in distributing gas through pipelines, due to increased pressure drops caused when water collects in low spots in the line and reduces the pipeline flow area for the gas. This condition is also conducive to corrosion in the pipe. Water vapor is therefore usually removed from the gas, and various methods are used for removal of these vapors.

Sour gas is the name commonly given to natural gas containing hydrogen sulphide $H_2S$. $H_2S$ is found in natural gas in concentrations varying from a trace up to 30% by weight. The presence of $H_2S$ causes severe corrosion to occur when free water is present in natural-gas pipelines. When burned, $H_2S$ forms sulphur dioxide, which is very toxic. The presence of $H_2S$ in natural gas is therefore a serious problem. Mercaptans, when airborne, can also present a problem because they have a foul smell.

Nitrogen is also frequently found in natural gas. It has no detrimental effects other than to lower the heat content of the gas. Oxygen is sometimes encountered in natural gas, but the quantities are usually so low as to be negligible. Another impurity that is only rarely encountered is helium, and the removal of helium is a specialized low-temperature process.

The basic processes used for removal of hydrocarbons invariably result in the removal of water vapors and unwanted acid components. The removal of water vapor or the adjustment of dew points is normally achieved by means of a glycol system that requires a counter current flow tower and glycol recovery system. $H_2S$ is normally removed as a gas using Amine systems, again requiring the Amine to be regenerated, often by a heated system. Conventional systems and a new compact contactor are described in US Patent No PCT/US2005/0020038. Furthermore, U.S. Pat. No. 6,918,949 B1 describes a method of contacting large volumes of gas, and U.S. Pat. No. 4,279,743 describes an air-sparged hydrocyclone.

It is an object of the invention to provide an improved gas-liquid contactor or Rapid Mass Transfer unit (RMT).

SUMMARY OF THE INVENTION

According to the present invention there is provided a contactor for reacting a flow of gas with a liquid, comprising a vessel, a first chamber in the vessel and a second chamber in the vessel, the first and second chambers being linked only by a porous wall, and means for directing ultrasonic noise into at least one of the first and second chambers.

It is an advantage of the contactor of the invention that it can be used as a rapid transfer device having a minimum retention or hold-up time within the unit. The contactor also minimizes the pressure required at inlets to the contactor, described below.

It is a particular advantage of the contactor that it is capable of rapid mass transfer of reactants, which react substantially instantaneously, such as the reaction of sodium silicates or sodium silicon with $CO_2$, $H_2S$, $NO_X$ and $SO_X$, i.e. contaminants in a fluid stream.

Preferably first and second inlets are connected to the respective first and second chambers.

Preferably the porous wall is made from a sintered metal.

Preferably an outlet is provided in the second chamber.

Preferably means is provided for directing pulsed ultrasonic noise into at least one of the first and second chambers.

Preferably ultrasonic transducers are disposed around the outside or inside of the vessel.

Preferably the vessel is substantially tubular, and the first and second chambers are both substantially tubular and disposed at least partly one within the other about a central axis.

Preferably the outlet extends from the end of the second chamber, and lies substantially on the central axis of the vessel.

Preferably the second inlet is substantially radial to the second chamber and a deflector is disposed in or adjacent the second inlet for directing incoming flow to swirl around the second chamber.

Preferably the first chamber is disposed within the second chamber.

Alternatively the second inlet is substantially tangential to the second chamber.

The second chamber may be disposed within the first chamber.

Preferably the second chamber is a cyclone, having a substantially cylindrical upper portion and a conical lower portion, the central axis of the vessel being disposed substantially vertically in use.

It is an advantage of the cyclone that the products of reaction can be at least partly separated, e.g. into the gas and liquid phase, within the contactor.

Preferably a further outlet extends from the upper end of the cyclone into the second chamber, an open end of the outlet being positioned on the central axis of the second chamber.

According to a further aspect of the invention there is provided a process apparatus comprising a plurality of contactors as claimed in any preceding claim in which the first outlet from each contactor is connected to a containment vessel, having a plurality of outlets at different vertical levels.

According to a further aspect of the invention there is provided a method of operating a contactor described above in which a gas is fed into the first chamber, and a liquid is fed into the second chamber, the gas being caused to pass through the porous wall to react with the liquid, whilst ultra sonic noise is directed to pass through the reacting liquid and gas in the second chamber.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF THE INVENTION

Figure 1:
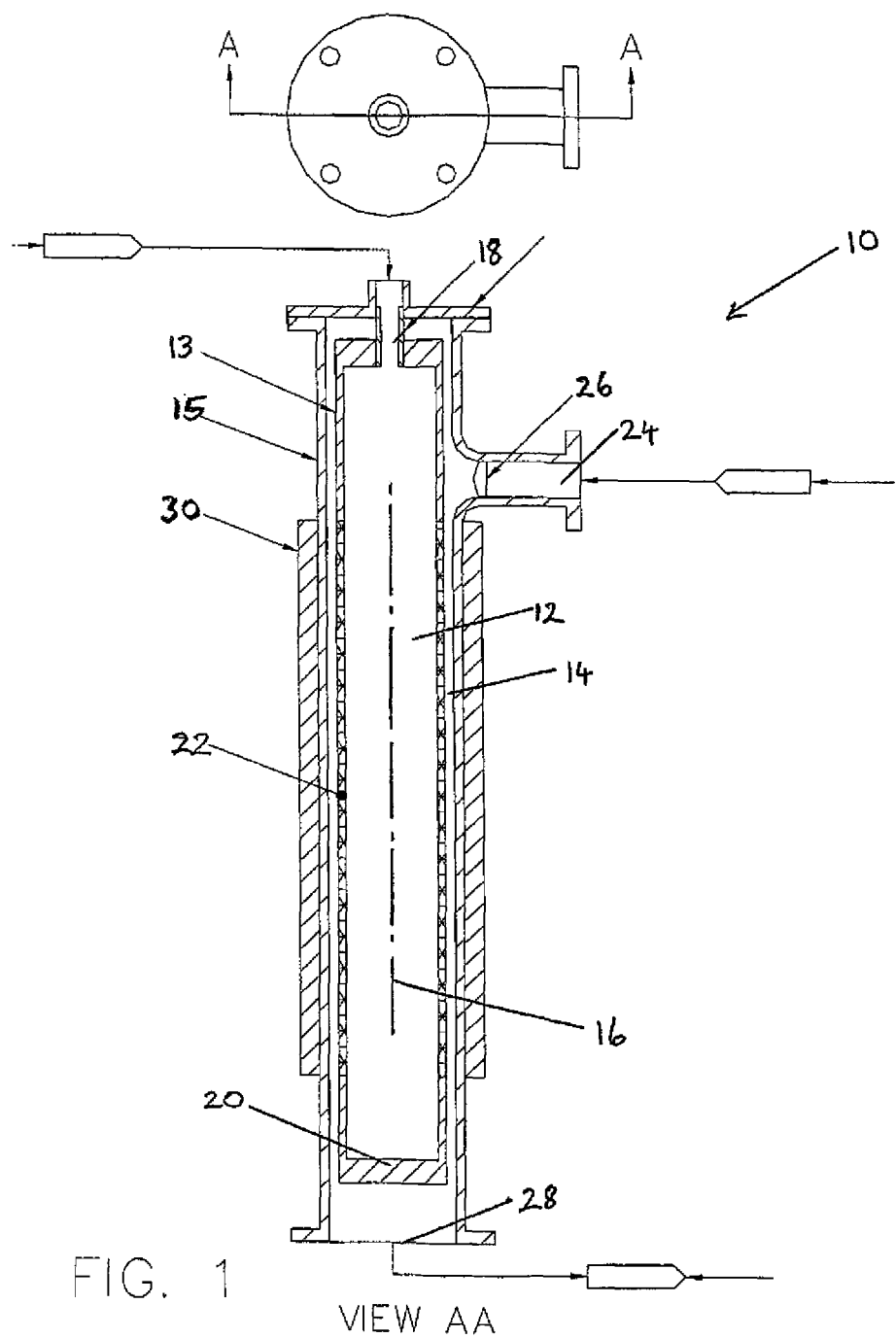
FIG. 1 is a sectioned schematic of a contactor unit.

Referring first to FIG. 1 a gas-liquid contactor is indicated generally at 10. The contactor 10 comprises a vessel having a first tubular chamber 12 and a second tubular chamber 14. The chambers 12, 14 have walls 13, 15, which are cylindrical and lie on a central vertical axis 16, as viewed, with the first chamber 12 disposed concentrically within the second chamber 16. The first chamber 12 has an axial inlet 18 at its upper end and its lower end 20 is sealed. The wall 13 of the first chamber 12 is porous over part of the chambers length, as indicated at 22, and is made from sintered metal.

The second chamber 14 has a substantially radial inlet 24, with an inlet deflector 26 which in use, causes inward flow to swirl in the second chamber 14, between the wall of the inner first chamber 12 and the wall 15 of the outer second chamber 14. An outlet 28 is provided at the lower end of the second chamber 14.

Ultrasonic transducers are disposed in a jacket 30 around the second chamber 14, and are directed inwardly. Alternatively, the transducers may be positioned within the second chamber 14.

In use, a gas stream, for example natural gas, for treatment enters the contactor 10 through the axial inlet 18. A liquid, i.e. a chemical, for example sodium silicon or sodium metasilicate, is fed into the second chamber 14 through the substantially radial inlet 24 and the deflector 26 causes the flow to swirl around the outside of the tubular first chamber 12 in the second chamber 14, which is shaped as an annulus. The flow passes through the annulus and reports to the outlet 28. The gas in the first chamber 12 percolates through the porous sintered wall 22 of the chamber into the swirling flow in the annulus where rapid contact with the chemical takes place. Ultrasonic noise, which may be pulsed, is directed through the gas liquid mixture, and accelerates the reaction between the gas and liquid. The high frequency sound produces cavitation within the fluid, known as "cold boiling", which increases the surface area available for chemical wetting, as well as agitation caused by the growth and implosion of cavitation bubbles under elevated pressure.

Figure 2:
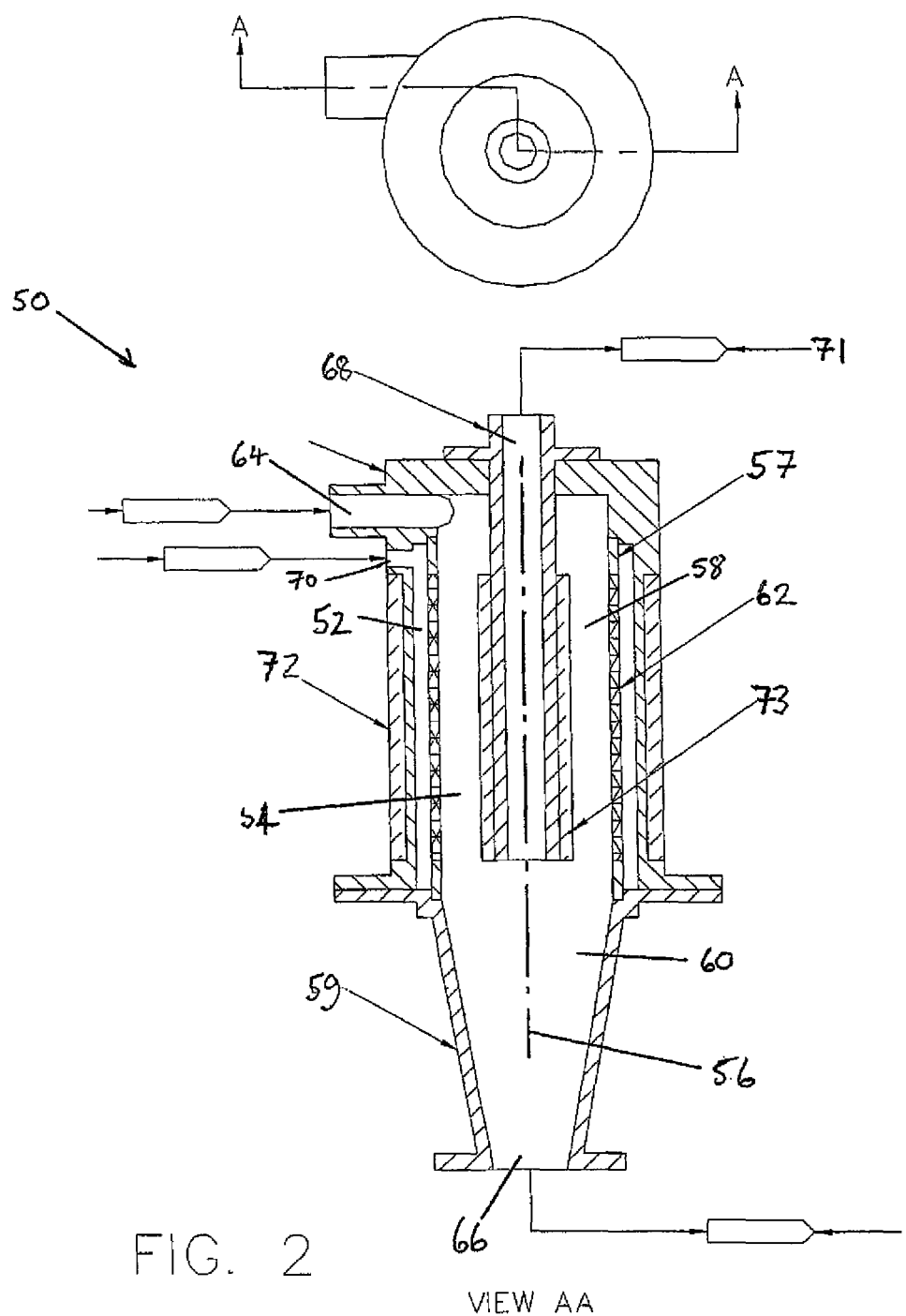
FIG. 2 is a sectioned schematic of a cyclonic contactor unit.

A second embodiment of a contactor is indicated at 50 in FIG. 2. The contactor 50 comprises a vessel having a first tubular chamber 52 and a second part-tubular chamber 54 disposed concentrically about an axis 56, within the first chamber. The second chamber 54 is constructed as a cyclone unit with a cylindrical wall 57 forming an upper portion 58 and a conical wall 59 forming a lower portion 60. A portion of wall between the inner and outer chambers, indicated at 62, is porous and is made from sintered metal. A tangential inlet 64 is provided at the upper end of the second chamber 54 and an axial outlet 66 is provided at the lower end of the chamber. An outlet 68 comprising a dip tub extends axially through the top of the vessel and extends into the second chamber, i.e. the cyclone chamber, to a position substantially at the lower end of the cylindrical upper portion 58 adjacent the conical portion. A gas inlet 70 is provided to the first chamber 52, also at its upper end. The first chamber 52 is sealed to the second chamber 54, save for the porous wall 62, as in the first embodiment. Ultrasonic transducers 72 are positioned around the vessel in the manner of a jacket and are directed inwardly. Furthermore, ultrasonic transducers 73 are disposed about the dip tube and are directed outwardly towards the chambers.

In use, the gas stream for treatment enters the contactor 50 through the inlet 70 and the chemical enters the contactor through the tangential inlet 64. The chemical swirls in the cyclone unit, i.e. the second chamber 54, and the gas swirls within the annulus, i.e. the first chamber 52, and is forced under pressure through the porous sintered tubular wall 62 into the cyclone unit, where it makes rapid contact with the chemical. As in the first embodiment, the ultrasonic transducers 72 emit ultrasonic noise which creates cavitation in the gas annulus and cyclone chamber to enhance the reaction between the chemical and gas to be treated. The ultra-sonic noise may be pulsed.

The gas is the lighter of the two phases, and migrates through the chemical and exits through the dip tube 68 and passes to an overflow outlet 71. The chemical, which is substantially de-gassed, reports to the cyclonic conical section 60, which acts as a back pressure and swirl accelerator within the unit. The under flow passes through the outlet 66 and can be connected directly to a de-gassing vessel and chemical collection vessel.

Figure 3:
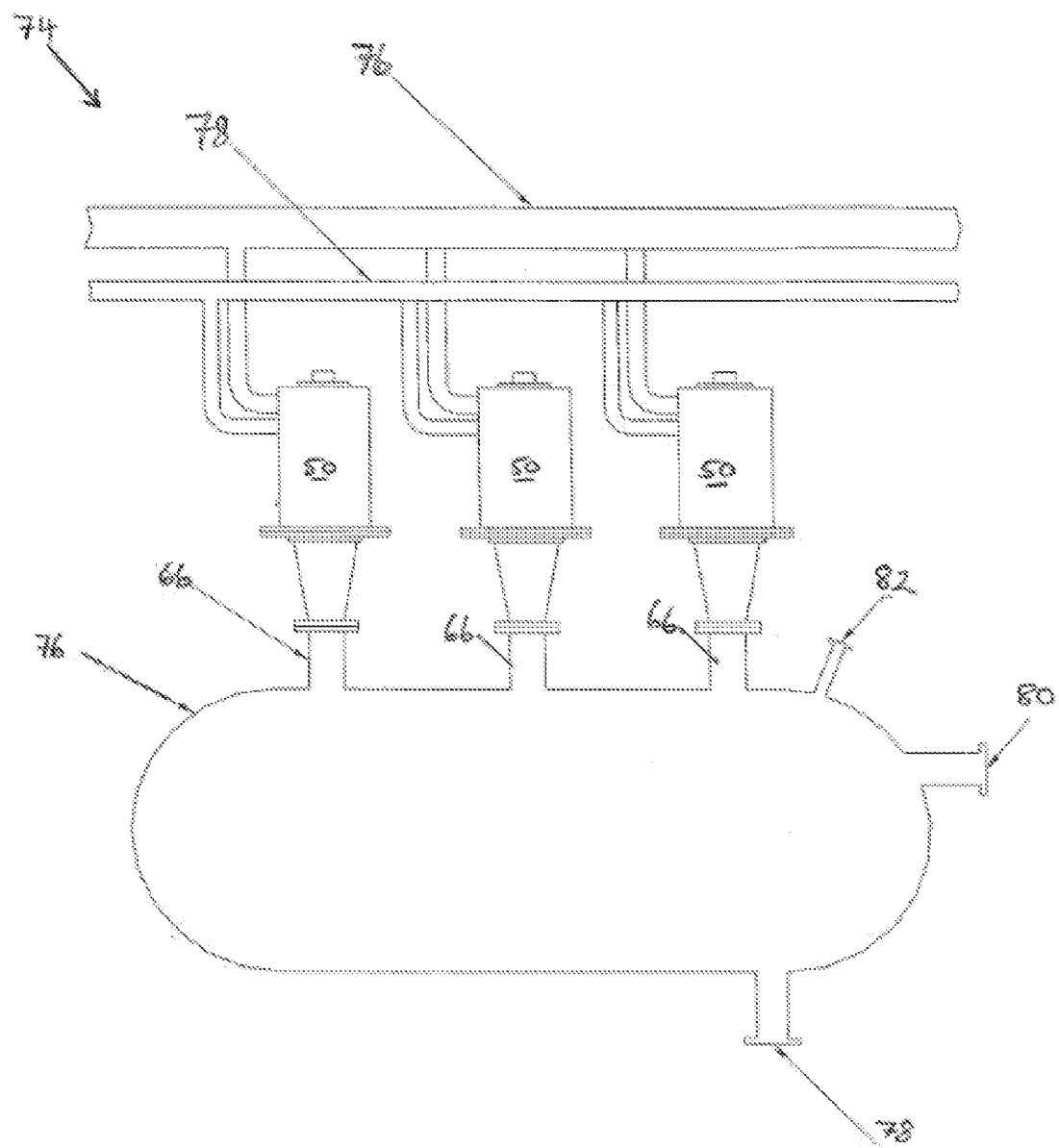
FIG. 3 is schematic representation of a manifolded cyclonic compact contactor unit.

Referring now to FIG. 3, a manifold system is indicated generally at 74. Inlet headers 76, 78 deliver fluid (gas) to be treated and chemical to a plurality of contactors 50. The outlets 66 of the contactors report to an inlet means to vessel or tank 76, which collects the liquid stream from the underflow of contactors 50. The vessel or tank 76 has a liquid level control including a liquid interface level indicator and control means which allows valve means to be actuated either manually or automatically to remove different liquid phases via outlets 78 and 80 respectively. Gas accumulates in the top of vessel 76 and is released under pressure control via a control valve means on an outlet 82. The gas reports to a light phase outlet header, which is in communication with the overflow outlets 71 at the top of each cyclonic contactor 50, (not shown for clarity). This arrangement is preferably valved to allow the flowrate through the system to be matched to in incoming required flowrate by switching on and off individual contactors as may be required.

The contactors described provide an improved means of reacting a liquid chemical with natural gas to remove impurities such as $H_2S$.

The contactor 10,50 is unaffected by motion, and as such finds utility, albeit not exclusively, on offshore floating production systems such as FPSOs (Floating Production Storage and Offloading) units or Tension Leg platforms. The contactor unit can also be used to enhance existing systems and in many cases can cause the redundancy and removal of re-boilers to regenerate glycol or Amine, this large unit being replaced by a new centrifugal clarifier.

A significant advantage of the second embodiment described, is that a reaction vessel and cyclone unit are combined for the treatment of a fluid stream. Not only is the apparatus capable of reacting the gas and liquid reactants, but also can, at least partially, separate the different phases based on their specific gravity differential, after the reaction has taken place within the contactor. The manifold system described with reference to FIG. 3 allows use of a process in which flow down turn or unit duty standby is required, e.g. in the case of large fluctuating flow rates.

The invention claimed is:

1. A contactor for reacting a flow of gas with a liquid, the contactor comprising:
   a vessel;
   first and second chambers defined within the vessel, wherein the first chamber is disposed within the second chamber;
   a porous wall providing the sole communication between the first and second chambers;
   a gas inlet for the first chamber;
   a liquid inlet and a liquid outlet for the second chamber; and
   means for directing ultrasonic noise into at least one of the first and second chambers, whereby gas entering the first chamber through the gas inlet passes through the porous wall to the second chamber to mix with the liquid.

2. A contactor as claimed in claim 1, in which the porous wall is made from a sintered metal.

3. A contactor as claimed in claim 1, in which the means for directing ultrasonic noise is adapted to direct pulsed ultrasonic noise into at least one of the first and second chambers.

4. A contactor as claimed in claim 1, in which ultrasonic transducers are disposed around the outside or inside of the vessel.

5. A contactor as claimed in claim 1, in which the vessel is substantially tubular, and the first and second chambers are both substantially tubular.

6. A contactor as claimed in claim 5, in which the outlet extends from the end of the second chamber, and lies substantially on the central axis of the vessel.

7. A contactor as claimed in claim 1, in which the liquid inlet is substantially radial to the second chamber and a deflector is disposed in or adjacent the liquid inlet for directing incoming flow to swirl around the second chamber.

8. A contactor as claimed in claim 1, in which the liquid inlet extends substantially tangentially into the second chamber.

9. A contactor as claimed in claim 8, in which the second chamber is a cyclone, having a substantially cylindrical upper portion and a conical lower portion, the central axis of the vessel being disposed substantially vertically in use.

10. A contactor as claimed in claim 9, in which a further outlet extends from the upper end of the cyclone into the second chamber, an open end of the outlet being positioned on the central axis of the second chamber.

11. A process apparatus comprising a containment vessel having a plurality of outlets at different vertical levels, and a plurality of contactors, each contactor comprising:
    a vessel;
    first and second chambers defined within the vessel, wherein the first chamber is disposed within the second chamber;
    a porous wall providing the sole communication between the first and second chambers;
    a gas inlet for the first chamber;
    a liquid inlet and a liquid outlet for the second chamber; and
    means for directing ultrasonic noise into at least one of the first and second chambers, whereby gas entering the first chamber through the gas inlet passes through the porous wall to the second chamber to mix with the liquid,
    in which the liquid outlet from each contactor is connected to the containment vessel.

12. A method of operating a contactor which comprises:
    a vessel;
    first and second chambers defined within the vessel, wherein the first chamber is disposed within the second chamber;
    a porous wall providing the sole communication between the first and second chambers;
    a gas inlet for the first chamber;
    a liquid inlet and a liquid outlet for the second chamber; and
    means for directing ultrasonic noise into at least one of the first and second chambers, whereby gas entering the first chamber through the gas inlet passes through the porous wall to the second chamber to mix with the liquid,
    in which method a gas is fed into the first chamber, and a liquid is fed into the second chamber, the gas being caused to pass through the porous wall to react with the liquid, whilst ultrasonic noise is directed to pass through the reacting liquid and gas in the second chamber.

* * * * *